March 4, 1969  L. M. FORBUSH  3,430,674

SLOTTED RETAINER FOR BOLT HEAD

Filed Jan. 13, 1967

INVENTOR.
Lothrop M. Forbush
BY
George E. Johnson
ATTORNEY 3,430,674
SLOTTED RETAINER FOR BOLT HEAD
Lothrop M. Forbush, Birmingham, Mich., assignor to General Motors Corporation, Detroit, Mich., a corporation of Delaware
Filed Jan. 13, 1967, Ser. No. 609,080
U.S. Cl. 151—41.7       1 Claim
Int. Cl. F16b 41/00

ABSTRACT OF THE DISCLOSURE

A bolt head retainer adaptable to receive or release a bolt at one side of the retainer enabling the latter and bolt to serve as a fastening for an element such as a frame.

Background of the invention

Often a support structure presents a wall accessible from only one side and it is desirable to attach a bolt to the wall detachably to hold a frame, strap or other element to the wall or vice versa. In such a case, the wall must provide opportunity for inserting the head of the bolt from the accessible side of the wall so that the bolt may subsequently and firmly be tightened to serve its function.

A blind key slot and bolt retainer combination is disclosed in the U.S. Patent 3,279,518 granted Oct. 18, 1966, in the name of Carl G. Bollinger. This patent discloses no resilient holding means for a bolt whereby the latter may be held under tension while being tightened or loosened. Such tension would facilitate tightening or loosening of the bolt and aid in preventing its inadvertent displacement as well as to maintain the fastening in its tightened condition.

Summary of the invention

The present invention resides in a retainer as part of a wall or easily fixed to a wall and which is capable of resiliently holding a bolt in tension despite prior insertion of the bolt head from the same side of the wall at which an element to be held by the bolt is located.

Description of the preferred embodiment

Figure 1:
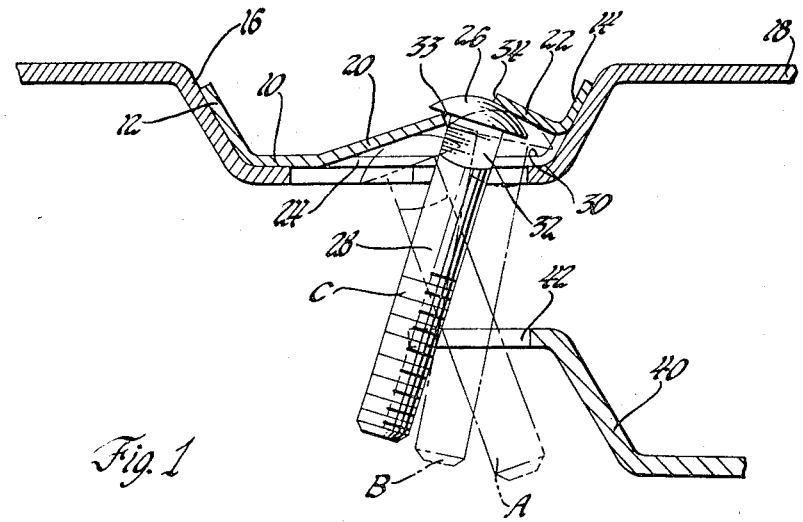
FIGURE 1 is a cross sectional view of a retainer and an element to be supported or fixed with relation to that retainer by means of a bolt and three positions of a bolt being shown in dot and dash lines with the retainer being a preferred embodiment of the present invention.

The retainer is shown as a wall portion 10 in the form of a flat plate with opposite margins 12 and 14 bent upwardly at an acute angle to conform with the sides of a recess 16 in a main portion or wall 18 of a supporting member. A T-shaped slot is formed in the retainer by cutting two tongues 20 and 22 from the sheet or plate material. These tongues are inclined toward each other and are located on one side of the retainer plate. One portion 24 of the slot is made wide so that the head 26 of a bolt 28 may pass through it. A second portion 30 of the slot is made narrow but adequate to receive a square shank 32 portion of the bolt. Advantageously the tongue 22 cut from the slot portion 30 is bent upwardly at an acute angle slightly greater than the acute angle of inclination for the tongue 20. The free and facing ends or edges 33 and 34 of the tongues 20 and 22 are made parallel to each other, i.e., at right angles with the length of the T-shaped slot.

The main portion or wall 18 is provided with a T-shaped slot 36 of a size slightly larger than the slot in the retainer 10. The shape of the slot 36 is immaterial in most cases and would vary depending upon the situation but it must be such that no interference will be had for insertion of the bolt 28.

Figure 2:
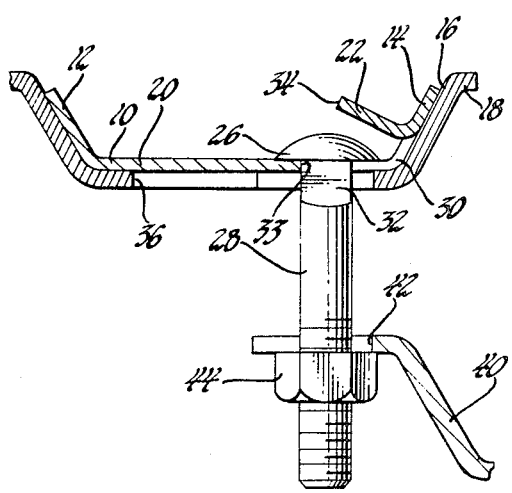
FIGURE 2 is a view similar to that of FIGURE 1 but with a bolt tightened into its holding position.

An element in the form of a bracket 40 having an open ended slot 42 is supported in spaced relation with the member 18 to serve as a weight-bearing device. In order to bring this about the bolt 28 is placed in position A as indicated in FIGURE 1 with the threaded part of the bolt in the slot 42. The bolt is then moved to a preassembled position B with the square shank portion 32 in the narrow slot 30 and the head against the tongue 22. Tongues 20 and 22 cooperate in preventing an inadvertently dropped bolt passing through the retainer 10. The bolt is then tilted the other way and placed in position C with one side of the bolt head overlapping the edge 33 of the large tongue 20. The bolt 28 is then pulled downwardly so that the tongue 20 fully enters the slot portion 24. This is done with the aid of the nut 44. The resilient bending of the tongue 20 from the plane of the slot portion 24 assures a tension being placed on the bolt as the latter is tightened into its assembled or holding position as finally assumed and as shown in FIGURE 2.

Figure 3:
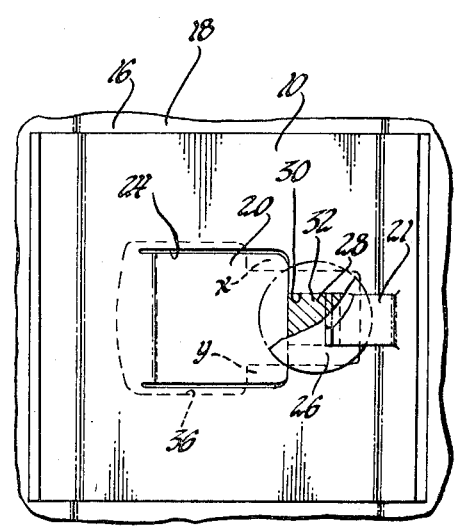
FIGURE 3 is a plan view of FIGURE 2 but with part of the bolt head removed.
Figure 4:
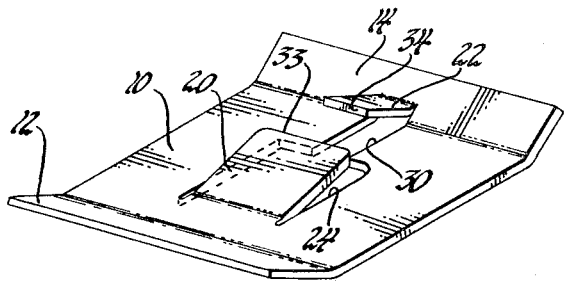
FIGURE 4 is a perspective view of the retainer of FIGURES 1, 2 and 3 but in its released form.

The edge 33 and the opposite sides of the slot portion 30 provide a three-sided contact to prevent turning of the square section 32 of the bolt and if more resistance to torque is required, the proportions of the retainer and the slot 36 may be changed to cause the main portion or wall 18 to abut the fourth side of the bolt section 32. The retainer 10 may or may not have the flanges 12 and 14 and it may or may not be welded or fixed permanently to the main wall portion 18 without departing from the spirit of the present invention. It will be noted in FIGURE 3 that the bolt head 26 bears down on the tongue 20 and that this tongue load is transferred to two opposed corner areas X and Y (FIGURE 3) of the main portion 18.

The subject device can be freed from restraint and returned to restraining position repeatedly without use of other than the bolt itself as the means for bending the tongue 20 into and out of the restraining position.

What is claimed is:

1. A combination fastener assembly to attach a bracket element to a wall having an inaccessible side comprising: a bolt having a square shank and a head, a slotted retainer adapted for mounting on the inaccessible side of a wall, said retainer including a sheet of resilient material having an area, two tongues cut from a portion of said sheet area leaving a T-shaped slot in the sheet and being integral with said sheet at opposite ends of said slot, one of said tongues being wide and inclined at a first acute angle with said area of sheet, the other of said tongues being narrow and being inclined at a second acute angle with said area, said second acute angle being greater than said first acute angle, that portion of said slot corresponding with said narrow tongue being receptive to said square shank of said bolt to prevent rotation therein, a free end on each of said tongues, said ends being spaced apart for the insertion of one side of said bolt head between them when said bolt is in a preassembled position, said wide tongue resiliently engageable with an underside of said bolt head to maintain a tension force in said bolt when said bolt is in an assembled position.

References Cited
UNITED STATES PATENTS

| | | | |
|---|---|---|---|
| 2,632,929 | 3/1953 | Poupitch | 151—41.75 |
| 2,746,340 | 5/1956 | Sislik | 85—36 |
| 2,899,700 | 8/1959 | Egan | 151—41.75 |
| 3,279,518 | 10/1966 | Bollinger | 151—41.7 |

EDWARD C. ALLEN, *Primary Examiner.*

U.S. Cl. X.R.

151—68